United States Patent [19]

Kok

[11] 4,374,794
[45] Feb. 22, 1983

[54] PROCESS FOR THE PREPARATION OF A LIQUID-ABSORBING AND SHOCK-ABSORBING MATERIAL

[76] Inventor: Cornelis J. M. Kok, Rhijnvis Feithstraat 44, Amsterdam, Netherlands, 1054 VA

[21] Appl. No.: 248,011

[22] Filed: Mar. 26, 1981

[30] Foreign Application Priority Data

May 2, 1980 [NL] Netherlands ..................... 80/02562

[51] Int. Cl.$^3$ ................................................. B01J 2/20
[52] U.S. Cl. .................................... 264/122; 264/141; 264/118
[58] Field of Search ........................ 264/118, 122, 141

[56] References Cited

U.S. PATENT DOCUMENTS 3,265,793  8/1966  Otremba ............................. 264/141
3,972,971  8/1976  Dantoni ............................. 264/141
4,032,393  6/1977  Alfeis et al. ....................... 264/122

FOREIGN PATENT DOCUMENTS 1513292  6/1978  United Kingdom .

Primary Examiner—James R. Hall
Attorney, Agent, or Firm—Kit M. Stetina

[57] ABSTRACT

A process for the preparation of a liquid-absorbing material from fibrous waste sludge is disclosed comprising the steps of partially dewatering the waste sludge to yield a semi-dry fibrous mass, forming the fibrous mass into a pelletized configuration, and drying the pellets into a resultant pellet product having a bulk density not exceeding 400 kg/m$^3$ and a water content of 0.5 through 10 percent by weight. Suitable dyes, odorants and/or biologically active compounds such as insecticides, fungicides, and bactericides may be added to the fibrous mass to adapt the resultant dried pellet product for use in particular absorption applications.

8 Claims, No Drawings

PROCESS FOR THE PREPARATION OF A LIQUID-ABSORBING AND SHOCK-ABSORBING MATERIAL

BACKGROUND OF THE PRESENT INVENTION

The present invention relates to a process for the preparation of a liquid-absorbing and shock-absorbing material and more particularly to a process for the preparation of a liquid-absorbing and shock-absorbing material from fibrous waste sludge wherein the resultant product comprises a pelletized material having a bulk density not exceeding 400 kg/m$^3$ and a water content of 0.5 through 10 percent by weight.

As is well known, waste water from the lumber, pulp, and paper industry generates an extremely large quantity of fibrous sludge which poses a severe disposal problem to the industry. Although a portion of this sludge can be recirculated for re-use in the manufacture of paper and board products, the cost of such recirculation has proven prohibitive in many applications. Dumping of the sludge has additionally proved cost prohibitive and further has raised concern as to adverse effects upon the environment. As such, there exists a substantial need in the art for an economical process and resultant product which permits the utilization of waste water sludge in an environmentally safe manner.

SUMMARY OF THE PRESENT INVENTION

The present invention specifically addresses and alleviates the above referenced deficiencies associated in the art by providing a process for the preparation of a liquid-absorbing and shock-absorbing material from fibrous waste sludge. Although it is known, for example, from the Netherlands patent application No. 7706339, that an oil-absorbing and water-repellant product can be made from a mixture of asp wood and a second fibrous filler together with a water-repellent agent, the known process is inapplicable to waste water sludge applications. In contra-distinction, the present invention is specifically suited to produce a material that not only possess oil-absorbing properties but also water and shock-absorbing properties, and additionally is derived from an inexpensive and abundantly available raw material, such as waste water sludge.

In particular, the present invention comprises a process for preparing a liquid-absorbing and shock-absorbing material from an aqueous suspension of fibers (such as waste sludge) wherein the sludge is partially dewatered together with an inorganic filler to yield a semi-dry mass. The mass is subsequently forced or extruded through one or more narrow apertures forming a pelletized configuration which is then subjected to a drying process. By controlling the extrusion pressure and drying conditions, the resultant product can be maintained within certain parameters such as a bulk density not exceeding 400 kg/m$^3$ and a water content of 0.5 through 10 percent by weight, which the applicant has found to yield an extremely suitable absorption product. Suitable dyes, odorants, and/or active compounds such as insecticides, fungicides, and bactericides may be added to the fibrous mass for particular absorption applications. These applications include oil absorption such as for use in removing oil from water surfaces, liquid absorption such as for use in litter material for domestic home and farm animals and shock absorption such as for use in packaging and or crating material.

These as well as other advantages of the present invention will become more apparent upon reference to the following enabling disclosure.

DETAILED DESCRIPTION OF THE PREFERRED EMBODIMENT

According to the present invention, the liquid-absorbing and shock-absorbing material is prepared by dewatering an aqueous suspension of fibers consisting wholly or substantially of cellulose (such as waste sludge) together with an inorganic filler to form a semi-dry mass, forcing this mass subsequently through one or more narrow apertures and then subjecting the substantially cylindrical pellets so obtained to a drying process. The suspension which is used as a raw material for the process according to the present invention preferably contains fibers and inorganic fillers in a weight ratio between 4:1 and 1.5:1, corresponding to 80–60% by weight of fibers and 20–40% by weight of filler, calculated on a dry material basis. Suitable fibrous materials are, for example, ground wood, thermomechanical wood pulp, sulphate pulp and sulphite pulp. Inorganic fillers that are eligible for use include kaolin, talcum, gypsum and chalk as well as mixtures of these and similar materials.

A very suitable and abundantly available starting material is the fiber-containing wet waste water, the so-called sludge, derived from a process in which fibers consisting wholly or substantially of cellulose are processed, as is customary, in the manufacture of paper, pulp and board. The present invention therefore makes it possible to use the waste water from these industries as starting material for the manufacture of a new and valuable product. Before being led to a filter, the waste water typically may have been subjected to a primary (mechanical) and a secondary (biological) purification process by techniques known in the art. The purified suspension led to the filter generally contains 1–10 grams of solid matter per liter of liquid.

If the weight ratio of fibers to inorganic filler in the waste sludge does not correspond to the desired ratio in the final product, it may be adjusted to the desired value by adding a quantity of the deficient component to the suspension, as required. This applies in particular to the inorganic filler, of which there is sometimes a deficiency in the sludge.

Dewatering of the suspension in order to obtain a semi-dry mass is preferably effected by means of a so-called belt filter, which includes a nylon screening belt having a mesh size sufficient to retain short as well as long fibers thereon. However, those skilled in the art will recognize that other conventional dewatering methods may be utilized without departing from the teachings of the present invention. In order to permit the semi-dry mass to be subsequently readily squeezed or extruded through one or more pellet forming apertures, it is desirable that this mass contains 40 to 80% by weight of water and preferably, between 55 and 65% water by weight. If the water content is too low, compression and extrusion of the mass into pellets requires an excessive squeezing pressure, as a result of which, the temperature of the mass rises unduly and the surface properties are adversely affected. Conversely, if the water content is too high, the pellets obtained from the mass possess reduced structural strength and tend to crumble upon storage.

Although it is generally possible to adjust the mass to the desired water content by means of a belt filter, it may be necessary after dewatering of the suspension to insert an additional drying step, for instance with the aid of a rotary dryer, by which the mass, if emerging too wet from the belt filter, can be adjusted to the desired water content.

Compression of the semi-dry mass into pellets is accomplished by means of devices known in the art such as a rotary pelletizing press (for instance, of the type used for the compression of cattle feed) or a die extruder with the mass preferably being crumbled prior to compression. Preferably, the press or die includes apertures having a diameter from 2 to 15 mm, in particular from 5 to 7 mm, and a length from 5 to 50 mm, in particular from 15 to 25 mm. During pelletizing, the virtually cylindrical rods emerging from the apertures break under their own weight into pieces approximately 10 to 30 mm long. It has been found that the pellets thus obtained generally retain this form and dimensions upon drying.

It is possible to modify the properties of the pellets by adding one or more admixtures either to the original suspension or to the semi-dry mass. If water-insoluable admixtures are used, these are preferably added to the suspension before the dewatering step. Water-soluable admixtures are preferably added to the semi-dry mass after dewatering. Depending on the intended uses of the pellets formed, suitable admixtures are, for example, dyes, odorants and biologically active compounds such as insecticides, fungicides and bactericides. To obtain pellets having a good firmness and dimensional stability, it is also desirable to incorporate a small quantity of another organic material such as starch or glues. The overall content of admixtures should preferably not exceed 10% by weight.

Drying of the formed pellets is preferably effected making use of a stream of hot air with a temperature between 100° and 150° C., in particular between 120° and 130° C. The device used for the drying step may be one known in the art such as a rotary dryer, a conveyor dryer or a cascade dryer. The drying process is preferably conducted such that the resultant dried pellets have a water content between 0.5 and 10% by weight, preferably between 5 and 8% by weight.

The bulk density of the pellets formed can be influenced by adjustment of the various materials involved in the process, notably the composition of the suspension (weight ratio of fibrous materials to fillers), the water content of the semi-dry mass, the pelletizing conditions (temperature, pressure and dimensions of the apertures) and the drying conditions (temperatures). To obtain pellets with good liquid-absorbing and shock-absorbing properties, these conditions are preferably adjusted such that the bulk density of the pellets is between 150 and 400 kg/m$^3$, in particular between 200 and 350 kg/m$^3$.

The pellets produced by means of the process according to the invention can be applied to a range of uses. For example, the pellets are capable of absorbing both oil and water and therefore suitable for the removal of oil from surface water, as litter material for cats' boxes and poultry houses and stables and as a material for cleaning liquid spills from floors. Typically, the resultant pellet product possesses a rate of absorption greater for oil than for water, and hence, preferential absorption of oil takes place when the pellets are scattered over stretches of water which have been contaminated with oil. Due to the presence of the inorganic filler, the density of pellets saturated with oil and water is generally greater than 1, so that they sink after absorption of the oil. The pellets are capable of absorbing 80 to 150% of their own weight in oil or 200 to 300% of their own weight in water. If, however, the density of pellets saturated with oil is smaller than 1, they obviously remain afloat on the water. In that case, they can easily be scooped up from the water and subsequently burned.

The pellets are also very suitable for use as shock-absorbing material for packaging and crating material. In comparison with the polystyrene beads customarily used for this purpose, the pellets derived by the process of the present invention have the advantage of absorbing liquid, and hence, may additionally serve as a packaging desiccant.

The exemplary properties for various pellet products derived in conformity with the process of the present invention are listed below. The particular pellet products were obtained from a suspension of fibrous materials and filler, derived from the waste sludge of the manufacture of newsprint, of which the dry substance comprised 56% by weight of a mixture of ground wood and thermomechanical pulp, 14% by weight of sulphate pulp prepared from pine, and 30% by weight of kaolin. The fibrous mass was initially dewatered over a belt filter in such a fashion that different batches were adjusted to include differing water contents. The different batches were processed with the aid of a laboratory meat mincer and a rotary pelletizing press into pellets which were dried with warm air to a water content of approximately 5% by weight. The apertures in the die of the pelletizing press had a diameter of 5 mm and a length of 17 mm.

The properties of the pellets obtained are listed in the following table.

|  | Batch No. | | | | | |
| --- | --- | --- | --- | --- | --- | --- |
|  | 1 | 2 | 3 | 4 | 5 | 6 |
| Water content of semi-dry mass before pelletizing (% by weight) | 68 | 59 | 70 | 59 | 52 | 43 |
| Processed with | mincer | mincer | pelletizer | pelletizer | pelletizer | pelletizer |
| Moisture content of pellets after drying (% by weight) | 5 | 5 | 5 | 5 | 5 | 5 |
| Bulk density (kg/m$^3$) | 200 | 230 | 250 | 250 | 290 | 340 |
| Maximum water uptake (% by weight) | 220 | 240 | 120 | 120 | 90 | 60 |
| Maximum oil uptake (% by weight) | 150 | 180 | 100 | 100 | 80 | 70 |
| Density of saturated pellets | >1 | >1 | >1 | >1 | >1 | >1 |
| Dimensional stability in water | moderate | moderate | good | good | good | good |

As is apparent from the above tabulation, the resultant pellet product derived from waste sludge in conformity with the process of the present invention comprises a superior liquid and shock absorbant product which eliminates the difficiencies heretofore associated in the art.

What is claimed is:

1. A process for the preparation of liquid absorbing and shock absorbing pellets comprising the steps of:

obtaining an aqueous suspension of fibers derived from waste sludge and consisting substantially of cellulose;

adding an inorganic filler to said aqueous suspension in an amount sufficient to adjust the composition of said aqueous suspension to have 60 through 80 percent weight of fibers and 40 through 20 percent weight of filler calculated on a dry basis;

partially dewatering said aqueous suspension to form a semi-dry mass having a water content of 40 to 80 percent by weight;

extruding said semi-dry mass through a die sized to form said mass into plural pellets; and drying said plural pellets to adjust the composition of said plural pellets to have the bulk density of 150 to 400 $Kg/M^3$ and a water content of 0.5 to 10 percent by weight.

2. The process of claim 1 comprising the further step of adding 0.1 through 10 percent by weight of an admixture to said aqueous suspension.

3. The process of claim 2 wherein said partially dewatering step forms a semi-dry mass having a water content of 55 through 65 percent by weight.

4. The process of claim 3 wherein said drying step comprises drying said plural pellets in a hot air stream having a temperature between 100 and 150 degrees Centigrade.

5. The process of claim 4 wherein said drying step adjusts the water content of said plural pellets to 0.5 to 8 percent by weight.

6. The process of claim 5 wherein said inorganic filler consists of one or more of the following materials: kaolin, talcum, gypsum or chalk.

7. The process of claim 6 wherein said admixture consists of one or more of the following materials: starch, glue, dye, odorant, insecticide, fungicide, or bactericide.

8. The process of claim 7 wherein the variables of each of said steps are adjusted to yield plural pellets having a bulk density between 200 and 350 $Kg/M^3$.

* * * * *